(12) United States Patent
Pochic et al.

(10) Patent No.: US 9,195,975 B2
(45) Date of Patent: Nov. 24, 2015

(54) DELIVERY OF INFORMATION SERVICES TO PERSONAL DEVICES

(75) Inventors: Sebastien Pochic, Brussels (BE); Barry Alan Maidment, Essex (GB); Mehdi Collinge, Braine-l'Alleud (BE); Fikret Ates, Namur (BE)

(73) Assignee: MasterCard International Incorporated, Purchase, NY (US)

( * ) Notice: Subject to any disclaimer, the term of this patent is extended or adjusted under 35 U.S.C. 154(b) by 131 days.

(21) Appl. No.: 13/636,418

(22) PCT Filed: Mar. 22, 2011

(86) PCT No.: PCT/GB2011/050568
§ 371 (c)(1),
(2), (4) Date: Dec. 11, 2012

(87) PCT Pub. No.: WO2011/117624
PCT Pub. Date: Sep. 29, 2011

(65) Prior Publication Data
US 2013/0080274 A1    Mar. 28, 2013

Related U.S. Application Data

(60) Provisional application No. 61/316,613, filed on Mar. 23, 2010.

(51) Int. Cl.
| G06Q 20/08 | (2012.01) |
| G06Q 20/10 | (2012.01) |
| G06Q 20/34 | (2012.01) |
| G06Q 20/40 | (2012.01) |
| G06Q 30/06 | (2012.01) |
| G07F 7/08 | (2006.01) |
| G07F 7/10 | (2006.01) |
| G07F 7/12 | (2006.01) |

(52) U.S. Cl.
CPC .............. *G06Q 20/08* (2013.01); *G06Q 20/105* (2013.01); *G06Q 20/3433* (2013.01); *G06Q 20/409* (2013.01); *G06Q 30/06* (2013.01); *G07F 7/0806* (2013.01); *G07F 7/1008* (2013.01); *G07F 7/122* (2013.01)

(58) Field of Classification Search
None
See application file for complete search history.

(56) References Cited

U.S. PATENT DOCUMENTS

| 7,127,507 | B1 * | 10/2006 | Clark et al. | 709/224 |
| 7,992,781 | B2 * | 8/2011 | Hammad | 235/380 |
| 8,682,785 | B2 * | 3/2014 | Ghosh et al. | 705/39 |
| 2003/0075610 | A1 * | 4/2003 | Ong | 235/492 |
| 2005/0247777 | A1 * | 11/2005 | Pitroda | 235/380 |
| 2007/0290049 | A1 | 12/2007 | Ratcliffe | |
| 2008/0197201 | A1 | 8/2008 | Manessis et al. | |
| 2009/0006262 | A1 | 1/2009 | Brown et al. | |
| 2009/0078777 | A1 * | 3/2009 | Granucci et al. | 235/492 |
| 2009/0314840 | A1 * | 12/2009 | Granucci et al. | 235/492 |
| 2010/0036770 | A1 | 2/2010 | Fourez et al. | |
| 2010/0065637 | A1 * | 3/2010 | Top et al. | 235/438 |
| 2011/0068170 | A1 | 3/2011 | Lehman | |
| 2013/0218778 | A1 * | 8/2013 | Singh | 705/44 |

FOREIGN PATENT DOCUMENTS

| WO | 01/61640 A1 | 8/2001 |
| WO | 2009/149348 A1 | 12/2009 |

OTHER PUBLICATIONS

"Notification Concerning Transmittal of International Preliminary Report on Patentability (Chapter I of the Patent Coo[eration Treaty) and the Written Opinion", dated Oct. 4, 2012, for International Application No. PCT/GB2011/050568, 8pgs.

* cited by examiner

*Primary Examiner* — Allen Chein
(74) *Attorney, Agent, or Firm* — Buckley, Maschoff & Talwalkar LLC

(57) ABSTRACT

A transaction processing system for sending user information data to a personal device, and an associated method are provided. The system comprises: a personal device, such as a balance display card; an interface device, such as a card reader for transmitting data to and from the card; a communications network connecting to the interface device; an issuer processor connected to the communications network; and a trusted network processor (TNP) processor connected to the communications network, interposed between the interface device and the issuer processor. The TNP processor is arranged to receive a transaction request message from a card user and to transmit a response message back to the personal device, the response message typically being a transaction authorization together with information for display on the card. The TNP processor is arranged to identify, dependent on properties of the transaction request message, whether the associated response message will require data to be sent to the user information device, and if so identified, to: route the transaction request message to the issuer processor using a standard message; receive the required data from the issuer processor using another standard message; match the received required data to the original request; generate an appropriate response message and script containing the required data; and transmit the response message back to the personal device thereby making the required information known to the user.

11 Claims, 17 Drawing Sheets

DELIVERY OF INFORMATION SERVICES TO PERSONAL DEVICES

This is application is a U.S. National Stage filing under 35 U.S.C. §371 and 35 U.S.C. §119, based on and the claiming benefit of and priority to PCT/GB2011/050568 for "DELIVERY OF INFORMATION SERVICES TO PERSONAL DEVICES", filed 22 Mar. 2011, claiming priority to U.S. Provisional Ser. No. 61/316,613, filed 23 Mar. 2010 each of which is hereby incorporated by reference in their entirety for all purposes.

FIELD OF THE INVENTION

The present invention relates generally to the delivery of information services to customers (for example, consumers and corporate employees) and, more particularly, to the delivery of such information services to personal devices held by such customers. One particular embodiment concerns a display card based information service. However, other embodiments of the present invention are not limited to display cards, but may also include other form factors of personal devices, such as key fobs, PDAs, mobile phones, etc.

BACKGROUND TO THE INVENTION

A display card is a credit card sized card with a visual display panel and control button(s). A display card may be used as a payment card in order to provide cardholders with relevant information.

The display card may be programmed with various types of functionality such as a stored-value application, a credit or debit application, a loyalty application, cardholder information, etc. Although a standard credit card-sized plastic card is generally currently used for display cards, it is contemplated that a display card may also be implemented in a smaller form factor personal device, such as key fobs, PDAs, mobile phones, etc. The below description provides an example of the possible elements of a display cards.

Depending on the functionality with which the display card is programmed, the user of the card will have the ability to receive information relating to that functionality. For example, it is known to provide a balance look-up facility in display cards having financial transaction functionality.

An example of such functionality is a card having an EMV chip. EMV is the global standard for inter-operation of integrated circuit cards (IC, or 'smart' cards) and smart card enabled point of sale terminals and automated teller machines (ATMs), for authenticating debit and credit card transactions.

The EMV standards define the interaction at the physical, electrical, data and application levels between IC cards and IC card processing devices for financial transactions. There are standards based on ISO/IEC 7816 for contact cards, and standards based on ISO/IEC 14443 for contactless cards. For example, ISO/IEC 7816-3 defines the transmission protocol between IC cards and their associated readers, whereby data is exchanged between the two in application protocol data units (APDUs).

In a standard EMV transaction flow, an authorization request is sent by the EMV terminal to the card Issuer, typically via Merchant, Acquirer and Trusted Network Processor (TNP) networks. The Issuer performs transaction authorization and sends an authorization response (either positive or negative) to the EMV terminal, typically via the same networks in reverse order: TNP, Acquirer and then Merchant.

With display cards, additional information flows can be included for sending information, such as updated account balance or previous transactions, for display on the card. At present, such additional information flows are processed by the Issuer alongside the authorization flow. This results in increased data traffic for the Issuer and adds a significant burden to the Issuer server.

It is an objective of the present invention to reduce the burden on the Issuer server. It is a further objective to do so using standard message flows, so as to avoid undue changes to the transaction flows. It is a yet further objective for this to be achieved so that the user is blind to the process; it is immaterial to the user by which route the displayed information has arrived at the card display, provided that its accuracy is not deleteriously affected. Another objective of the invention is to implement value added services without significantly affecting existing transaction flows.

In relation to display cards, some embodiments of information service proposition concepts are described herein with details of some embodiments of the architectures and information flows required to facilitate the provision of some embodiments of such information services.

The details of cardholder interactions with the display card (i.e. the card's user interface) and the driving of the visual display are not described in detail herein.

SUMMARY OF THE INVENTION

According to a first aspect of the invention, there is provided a transaction processing system for sending user information data to a personal device, the system comprising:
  a personal device comprising:
    an integrated circuit element; and
    a user information device for making information known to a user of the personal device;
  an interface device for transmitting data to and from the personal device;
  a communications network connecting to the interface device;
  an issuer processor connected to the communications network; and
  a trusted network processor (TNP) processor connected to the communications network, interposed between the interface device and the issuer processor, and arranged to receive a transaction request message from a user of the personal device and to transmit a response message back to the personal device;
  wherein the TNP processor is arranged to identify, dependent on properties of the transaction request message, whether the associated response message will require data to be sent to the user information device, and if so identified, to:
    route the transaction request message to the issuer processor using a standard message;
    receive the required data from the issuer processor using another standard message;
    match the received required data to the original request;
    generate an appropriate response message and script containing the required data; and
    transmit the response message back to the personal device thereby making the required information known to the user.

Such a system enables enhanced functionality for personal device (card) issuers without impacting their back-end (e.g. authorization) systems. As an example, issuers can deploy balance display cards, in which case, for each authorization request received from a terminal, the 'issuer proxy' steps taken by the TNP on behalf of the issuer can: 1) send the authorization request followed by a balance inquiry—which are 2 standard messages—to the issuer; and 2) send the received response(s) back to the card for display. This relieves the issuer server of load whilst providing enhanced functionality for the card user (e.g. balance display).

Moreover, issuers can deploy display cards managing data coming from several data providers without impacting their authorization systems. In this case, for example, for each authorization request, the 'issuer proxy' steps taken by the TNP on behalf of the issuer can query different data providers/partners—e.g., transit operators, retailers—in parallel and add all the relevant information to the authorization response.

Typically, the personal device comprises an information display card, the user information device being a display on the card. In other embodiments, the information may be 'displayed' by other means, such as via an audible signal over a speaker, or via a tactile 'display'.

The invention is particularly suited to personal devices (such as display cards) having an EMV chip. The standardised EMV transaction flows can be adapted and used to obtain and transmit the required information to the user (e.g. via the display).

In particular with embodiments having an EMV chip, but not limited thereto, the interface device may comprise a point of sale terminal or an ATM. Alternatively, the interface device may comprise a personal card reader (i.e., a device similar to a CAP reader but connected to a personal computer).

The personal device and the interface device may each have near field communication capabilities for the contactless transmission of data therebetween. Alternatively, the personal device and the interface device may each have electrical contacts and data transmission between the personal device and the interface device may be by wired communication between the respective contacts.

The interface device may instead comprise a wide-area wireless communication integrated into the personal device. Examples include a wi-fi enabled device or a device having a mobile network SIM.

It will be understood that a single personal device may be provided with more than one such way in which to transmit data.

Typically, the integrated circuit element hosts business application software.

In embodiments in which the integrated circuit element comprises an EMV chip, the TNP processor may be further arranged to identify whether, dependent on properties of the transaction request message, the transaction additionally calls for an authorization decision, and if so identified, to:
  split the transaction request message into a first standard message requesting authorization and a second standard message requesting the required user information;
  route the authorization request message to the issuer processor;
  route the required user information request message to the issuer processor;
  receive an authorization response message from the issuer using another standard message;
  receive the required data from the issuer processor using another standard message;
  match the received required data and authorization response to the original request;
  generate an appropriate response message and script containing the required data and authorization; and
  transmit the response message back to the personal device thereby making the required information known to the user and authorizing the transaction.

In an alternative embodiment, the system further comprises a third party processor hosting the required user information, and rather than routing the required user information request message to the issuer processor, the TNP processor routes the required user information request message to the third party processor, and duly receives the required data from the third party processor using a standard message.

In certain embodiments, the required user information is an account balance. In other embodiments, the required user information may concern past transactions.

According to a second aspect of the invention, there is provided a method of sending user information data to a personal device, the method being in a transaction processing system and comprising the steps of:
  receiving, at a trusted network processor (TNP) server, a transaction request message from a user of the personal device;
  identifying, dependent on properties of the transaction request message, whether an associated response message will require data to be sent to the user information device, and if so identified:
  routing the transaction request message to an issuer server using a standard message;
  receiving the required data from the issuer server using another standard message;
  matching the received required data to the original request;
  generating an appropriate response message and script containing the required data; and
  transmitting the response message back to the personal device.

The method may further comprise making the required data known to the user of the personal device through a user information device on the personal device.

In some embodiments the method may comprise, in the identifying step, further identifying whether, dependent on properties of the transaction request message, the transaction additionally calls for an authorization decision, and if so identified:
  splitting the transaction request message into a first standard message requesting authorization and a second standard message requesting the required user information;
  routing the authorization request message to the issuer processor;
  routing the required user information request message to the issuer processor;
  receiving an authorization response message from the issuer using another standard message;
  receiving the required data from the issuer processor using another standard message;
  matching the received required data and authorization response to the original request;
  generating an appropriate response message and script containing the required data and authorization; and
  transmitting the response message back to the personal device thereby making the required information known to the user and authorizing the transaction.

In alternative embodiments, rather than routing the required user information request message to the issuer processor, the TNP processor routes the required user information request message to a third party processor hosting the required user information, and duly receives the required data from the third party processor using a standard message.

BRIEF DESCRIPTION OF THE DRAWINGS

The invention will be described, by way of example, with reference to the accompanying drawings, in which.

DETAILED DESCRIPTION

Customer Information Service Concepts

Figure 1:
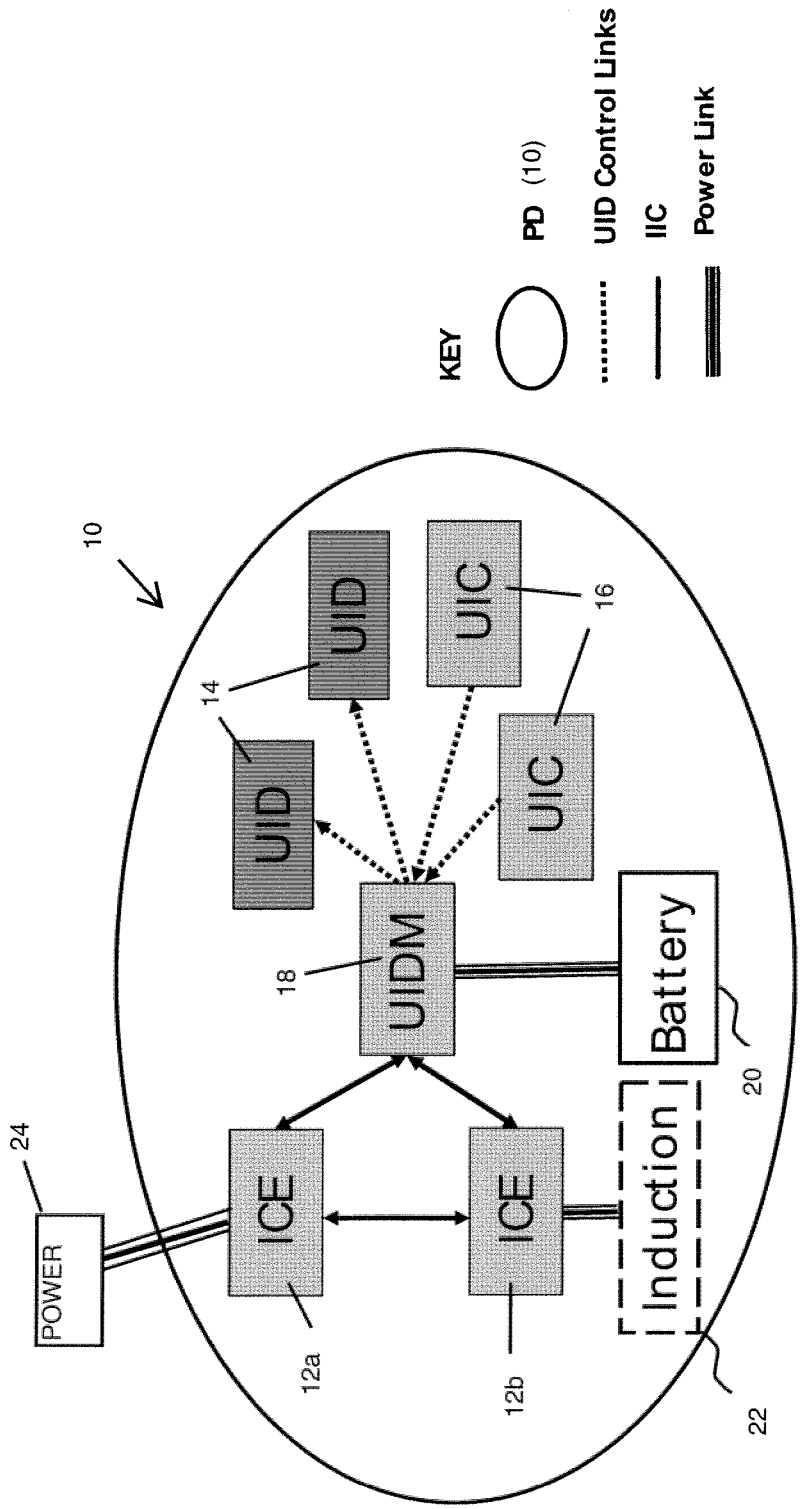
FIG. 1 is a schematic diagram of the conceptual physical architecture of a personal device (PD) for use in connection with the present invention.

This section describes and illustrates the general concepts relating to the proposed provision of customer information services. A specific instance of the implementation of such services, using information display cards, is developed further below.

The following sub-sections deal with terminology, personal device architecture (physical and software), message flows and inter ICE/UDIM communications security.

TERMINOLOGY

The terms used to describe the customer information service environment are defined in the following table.

| Concept | Description | Example Instances |
| --- | --- | --- |
| Personal Device (PD) | A portable device held by the customer. | Credit Card Authentication Token |
| Personal Device Form Factor (PDFF) | A given physical format of the PD. | ISO Card; Key Fob; |
| Integrated Circuit Element (ICE) | An electronic chip with computing and data storage capabilities. | EMV Compliant Chip; MiFare Chip; UID Microcontroller |
| User Information Device (UID) | A physical element, forming part of the PDFF, through which information is made known to the customer. | Visual Display; Speaker |
| User Interface Control (UIC) | The means by which the customer inputs commands to the PDFF | Keys/buttons; Microphone (speech) |
| User Interface Manager (UIM) | Software that controls the UIDs on a PDFF. The UIM may receive commands from BA's to output data to a UID or may request data from a BA. The BAs may reside on the same ICE as the UIM or a different ICE. | Visual Display Manager; Speaker Manager Microphone Manager Multi-device Manager |
| UID Microcontroller (UIDM) | ICE on which the UIM resides and which has comms links to the UID(s) on the same PD. | — |
| Business Application (BA) | A software application that resides on an ICE and provides business functionality. | EMV Payment; OTP; Loyalty; Transit Ticketing |
| Business Application Manager (BAM) | Software that controls the Bas resident on the same ICE. | GlobalPayments; JavaCard |
| Wide Area Comms (WAC) | A data communications network covering a large geographical area. | Wired Network e.g. MasterCard network; Radio e.g. mobile data network |
| Proximity Data Comms (PDC) | Wireless, very short-range data communications. | RF (Radio Frequency); NFC (Near Field Communications); Infrared |
| Inter-ICE Comms (IIC) | Data communications between ICEs resident on the same PDFF. | GlobalPayments; ? |
| Inter-BA Comms (IBAC) | Data communications between either: 1. An off-PD system and a BA; or 2. BAs resident on either the same ICE or different ICEs on the same PDFF. All interactions with BAs are mediated through their respective BAMs. | GlobalPayments; JavaCard |
| Actors: | | |
| Customer | Legal entity that receives services from a CRO. | Person; Partnership; Corporation; Government or quasi-governmental body |
| Personal Device Holder (PDH) | Person holding and using a PD. A PDH may be a customer or a person authorized by a customer. | Cardholder; Key Fob User |

-continued

| | Description | Example Instances |
|---|---|---|
| Customer Relationship Owner (CRO) | The entity that owns the relationship with the customer and issues the PD. | Card Issuer; Token Issuer |
| Business Application Owner (BAO) | An entity that owns a Business Application. This entity may be the CRO or a partner of the CRO. | Bank; Retailer; Transit company |
| POU Owner (POUO) | The entity that owns a given POU. | Bank owning ATMs; Merchant owning POS terminals |
| POU Manager (POUM) | The entity that acquires PD's requests from POUs and routes them to the TNP. | Acquiring bank |
| Customer Relationship Processor (CRP) | The entity that provides processing and data storage services related to maintaining customer and PDH relationships. | Card Issuer (CRO); Third Party Processor processing on behalf of a CRO |
| Business Application Processor (BAP) | The entity that provides processing and data storage services required to support BAs. | Card Issuer processing prepaid accounts; Third Party Processor processing on behalf of a prepaid issuer. |
| Personal Device Processor (PDP) | The entity that provides processing and data storage services required to maintain PDs and manage relationships between the CRO and BAPs, | Card Issuer (CRO); Third Party Processor processing on behalf of a CRO. |
| Trusted Network Processor (TNP) | The entity that provides processing and data storage services required to route information requests and responses between the point of use of a PD and the BAP. | MasterCard |
| Point of Use (POU) | The electronic acceptance point at which a PD is used to request/receive information services. | ATM (Automated Telling Machine); POS (Point of Sale) Terminal; Internet Access Device e.g. Personal Computer with connected card reader. |
| PD/POU Interface | Interface for data transmissions between a PD and a POU. | EMV Contactless Card/Terminal Interface; EMV Contact Card/Terminal Interface; ITSO Card/Terminal Interface |

Personal Device Architecture

The conceptual architecture of Personal Devices (PDs) is described in the following sub-sections in terms of the physical and software architectures.

Physical Architecture

The PD's conceptual physical architecture is independent of the PDFF (Personal Device Form Factor) type.

With reference to FIG. 1, a PD 10 may have multiple Integrated Circuit Elements (ICEs) 12, User Information Devices (UIDs) 14, User Interface Controls (UICs) 16 and UID Microcontrollers (UIDMs) 18, but must have at least one of each. The embodiment of FIG. 1 shows an exemplary PD 10 with two of each of an ICE 12, UID 14 and UIC 16 and a single UIDM 18 (multiple UIDMs are possible but are considered to be unlikely in practice).

At least one ICE 12 on a PD 10 must provide Customer Information Services and multiple ICEs 12 may do so. An ICE 12 that provides Customer Information Services must interface with a UIDM 18 in order to send requests for data to be presented to the customer by a UID 14 and, or alternatively, to receive requests for data from the UIDM 18 and send responses. (For clarity, a PD 10 may also have an ICE 12 or ICEs 12 that do not provide such services and, therefore, do not interface to a UIDM 18).

A UIDM 18 will:
control at least one UID 14, and optionally more, and at least one UIC 16, and optionally more; and
interface with at least one ICE 12, and optionally more,
Each UID 14 and UIC 16 will be controlled by a single UIDM 18.

Electronic components on a PD 10 may be powered by a battery 20, induction 22 or contact with an external power source 24. Components on the same PD 10 may have different power sources. The illustration of FIG. 1 shows an example in which the UIDM 18, UIDs 14 and UICs 16 are powered by battery 20, one ICE 12a is powered by induction 22, and one other ICE 12b by contact with an external power source 24.

An ICE 12 may use contact technology for communications across the PD/POU Interface and contactless technology for a PDC (Proximity Data Communications) based PD/POU Interface. An ICE 12 may have WAC (Wide Area Communications) capabilities, similar to a mobile's SIM (Subscriber Identity Module).

Optionally, an ICE 12 may be linked to other (non-UIDM) ICEs 12 to interchange data.

Software Architecture

Figure 2:
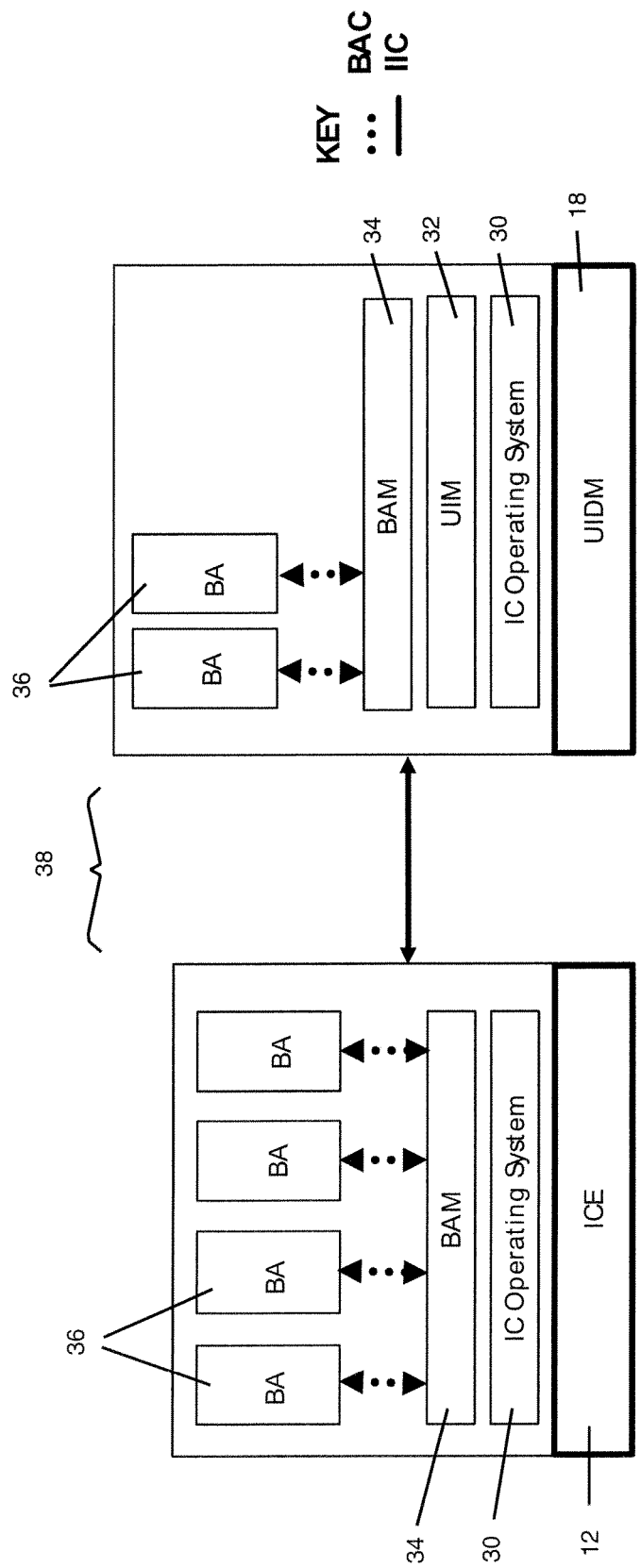
FIG. 2 is a schematic representation of software architecture within the PD.

With reference to FIG. 2, an ICE/UIDM will have an operating system 30 that interfaces between the physical ICE 12,18 (noting that the UIDM 18 is a special case of an ICE) and the software applications: the User Interface Manager (UIM) 32, Business Application Manager (BAM) 34, Business Application (BA) 36 that are run on the ICE 12,18.

An ICE 12,18 will operate one or more BAs 36 that is/are controlled by a BAM 34. A UIDM 18 (a special case of an ICE) may operate a UIM 32 only or may also operate one or more BAs 36 that is/are controlled by a BAM 34.

A BA 36 may interact with other Bas 36 on the same ICE 12 through that ICE's BAM 34. A BA 36 may interact with other BAs 36 on different ICEs 12,18 through its own BAM 34 and the BAMs 34 of the counterparty Bas 36.

The illustration of FIG. 2 shows a single ICE 12 linked to a UIDM 18 (as noted n the previous sub-section, there could be multiple ICEs 12 linked to a UIDM 18). When multiple ICEs 12 are linked to a UIDM 18, that UDIM's UIM 32 will have control over the priority of competing ICE requests for the presentation of information.

Message Flows

In this sub-section, various message flows across and between an ICE 12 and a UDIM 18 on a PD 10 are illustrated. These flows are not intended to be exhaustive. The simpler situation where data stored or generated by a BA 36 on the UDIM 18 is to be presented to the customer is not illustrated. The communications link between an ICE 12 and a UDIM 18 (or between two ICEs 12) may use a secured protocol (see 'Inter-ICE/UDIM Communications Security' below).

Figure 3:
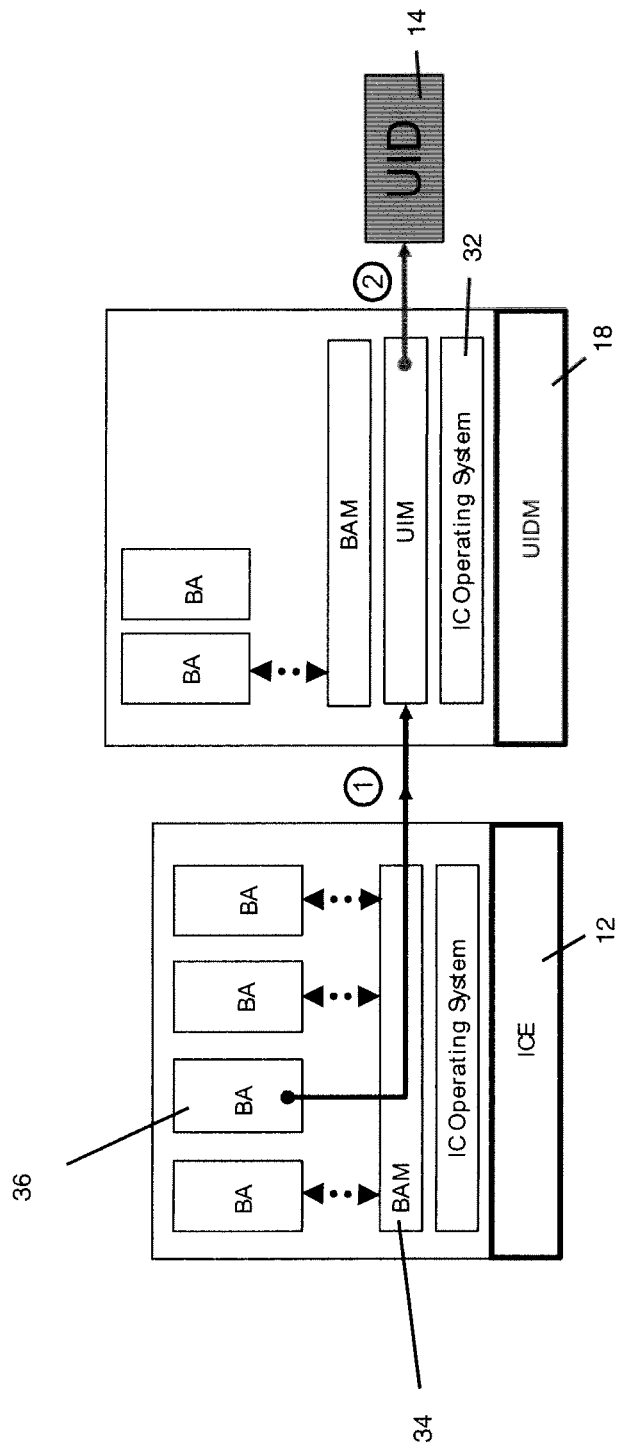
FIG. 3 corresponds to FIG. 2, but includes an example of a message flow in which information is generated automatically by a business application (BA) and routed to the user information device (UID)

FIG. 3 illustrates the automatic generation of information by a BA 36 on an ICE 12, the routing of the information via the ICE's BAM 34 to the UDIM's UIM 32 (flow 1) and the automatic presentation of that information by a UID 14 (flow 2). The information could be, for example, a birthday or anniversary greeting or reminder.

Figure 4:
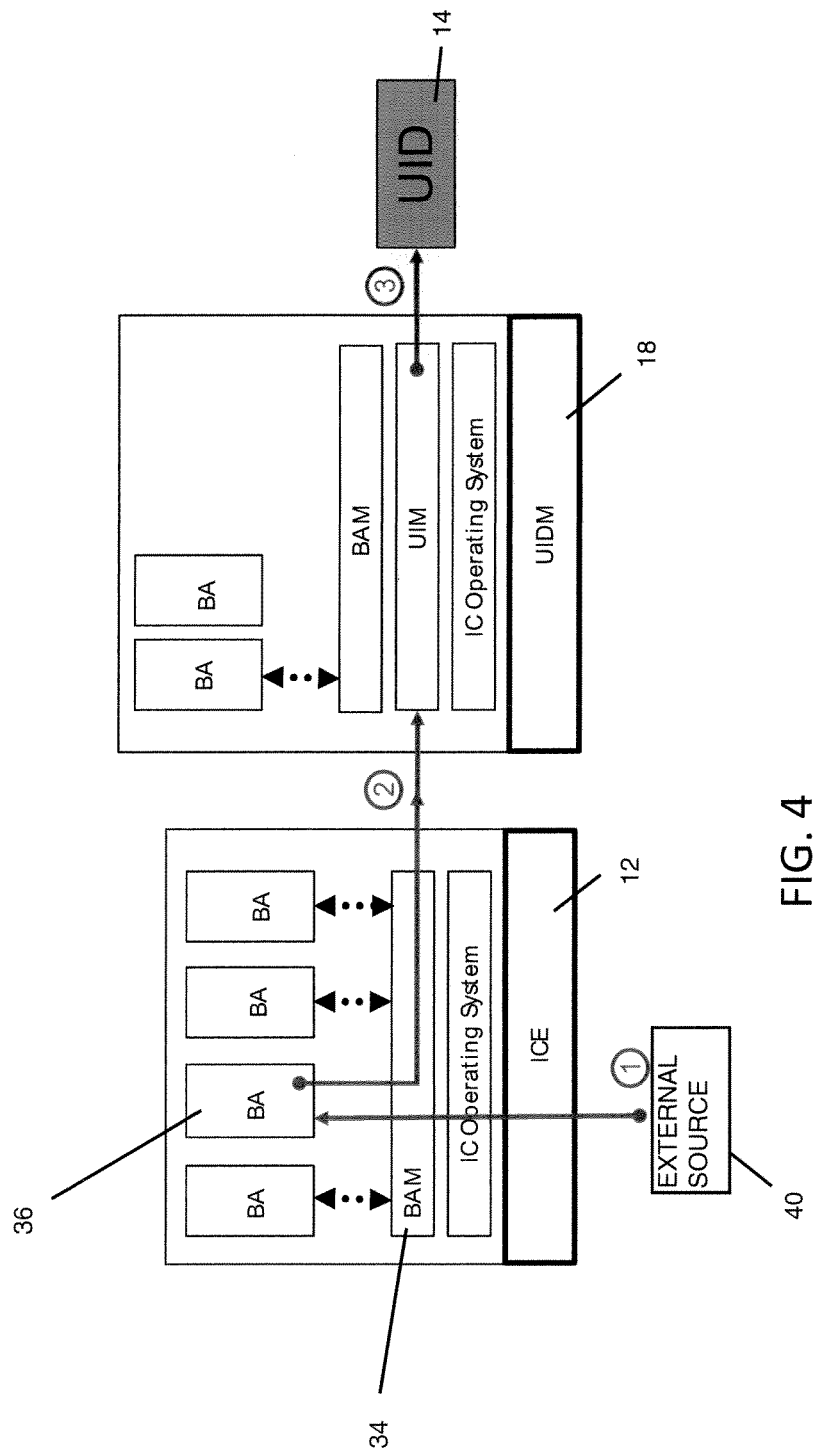
FIG. 4 corresponds to FIG. 3, but shows an example of a message flow in which information is provided externally to a BA and then automatically routed to the UID.

FIG. 4 illustrates a situation where information has been provided by an external source 40 to a BA 36 (flow 1) and then automatically sent by the BA 36 via the ICE's BAM 34 to the UDIM's UIM 32 (flow 2) and automatically presented by a UID 14 (flow 3). In this regards, flows 2 and 3 respectively correspond to flows 1 and 2 of the preceding example of FIG.

3. The information could be, for example, a marketing message received by an EMV chip from a POS terminal.

Figure 5:
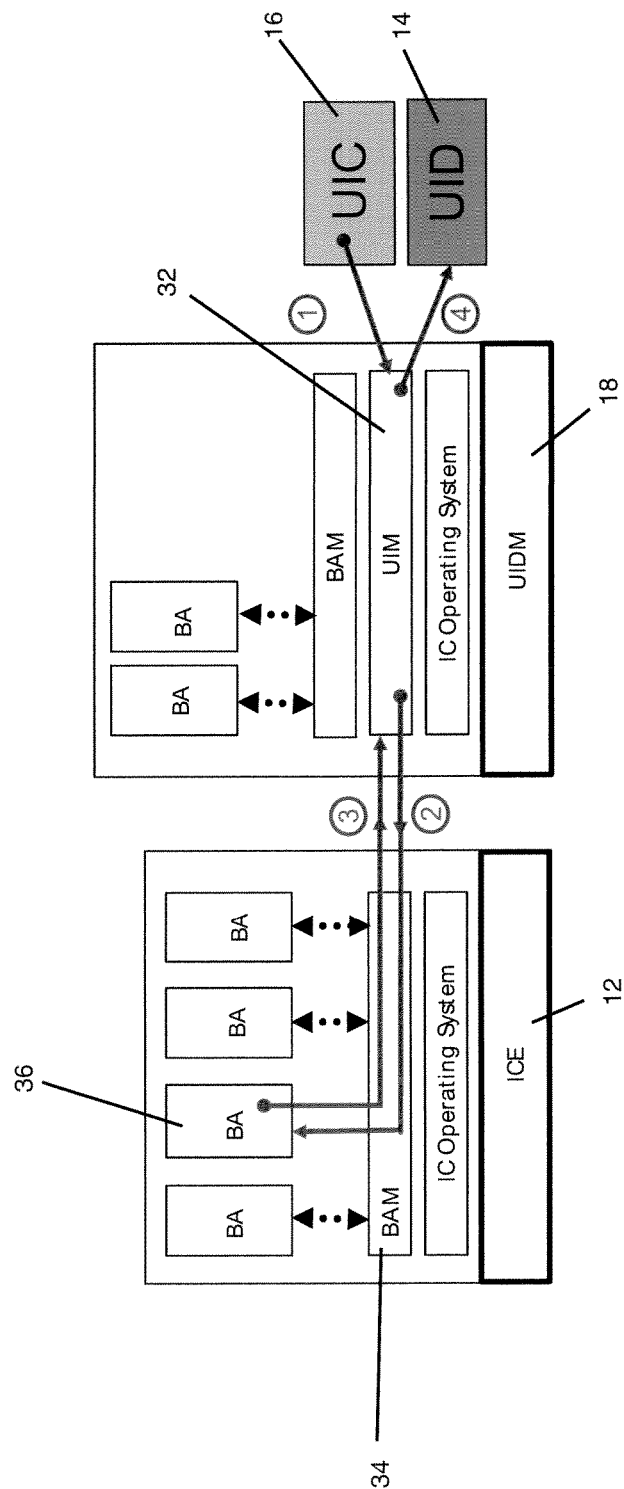
FIG. 5 again corresponds, but shows a situation where information has been generated automatically by a BA but is not displayed until a manual request is made via a user interface control (UIC)

FIG. 5 shows a situation where information has been generated automatically by a BA 36 but is not displayed until a manual request is made via a UIC 16 (flow 1). The request is sent by the UDIM's UIM 32 to the ICE's BAM 34 and thence to the relevant BA 36 (flow 2). The BA 36 returns the requested information via the BAM 34 and UIM 32 (flow 3) to be presented by the relevant UID 14 (flow 4). This example therefore corresponds to that of FIG. 3 except that information flows 3 and 4, which respectively correspond to information flows 1 and 2 of the example of FIG. 3, are only initiated once the user has made a manual request. An example of this kind of information could be a stored loyalty points balance that is automatically updated by the relevant BA 36 after an offline transaction but only displayed upon a cardholder pressing a button.

Figure 6:
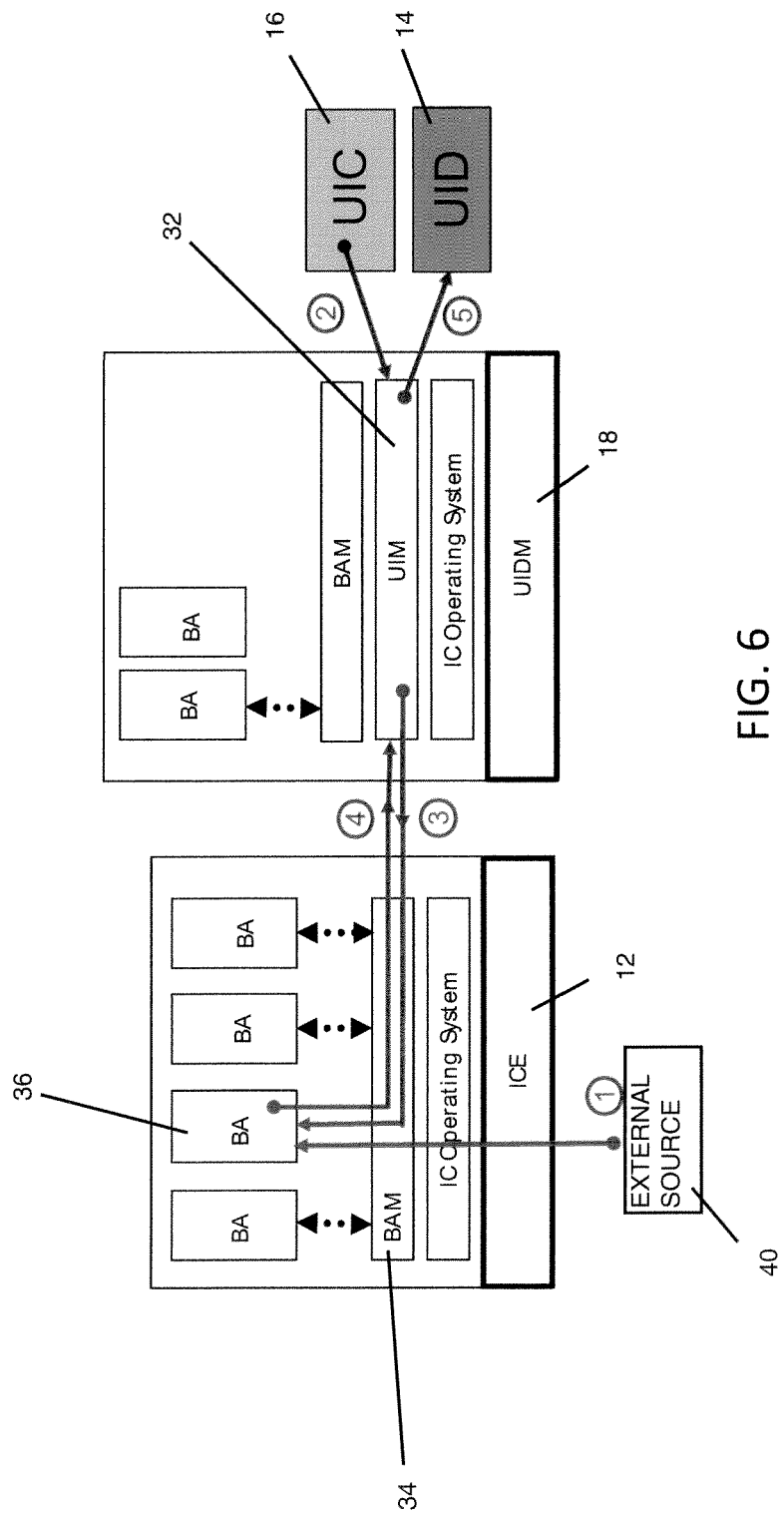
FIG. 6 again corresponds, but shows a situation where information is provided by an external source to a BA and then stored until the customer manually requests its presentation.

FIG. 6 shows an example where information is provided by an external source 40 to a BA 36 and then stored until the customer manually requests its presentation. The customer initiates the request via a UIC 16 (flow 2); the request is received by the UDIM's UIM 32 and sent via the ICE's BAM 34 to the relevant BA 36 (flow 3). The BA 36 responds by sending the requested information via the BAM 34 to the UIM 32 (flow 4), which routes it to the appropriate UID 14 (flow 5) for presentation. In this regard, this example corresponds to that of FIG. 4, except that information flows 4 and 5, which respectively correspond to information flows 2 and 3 of the example of FIG. 4, are only initiated once the user has made a manual request. The information presented could be, for example, an account balance downloaded to an EMV chip during an online transaction, which is subsequently displayed when the customer presses a button.

Figure 7:
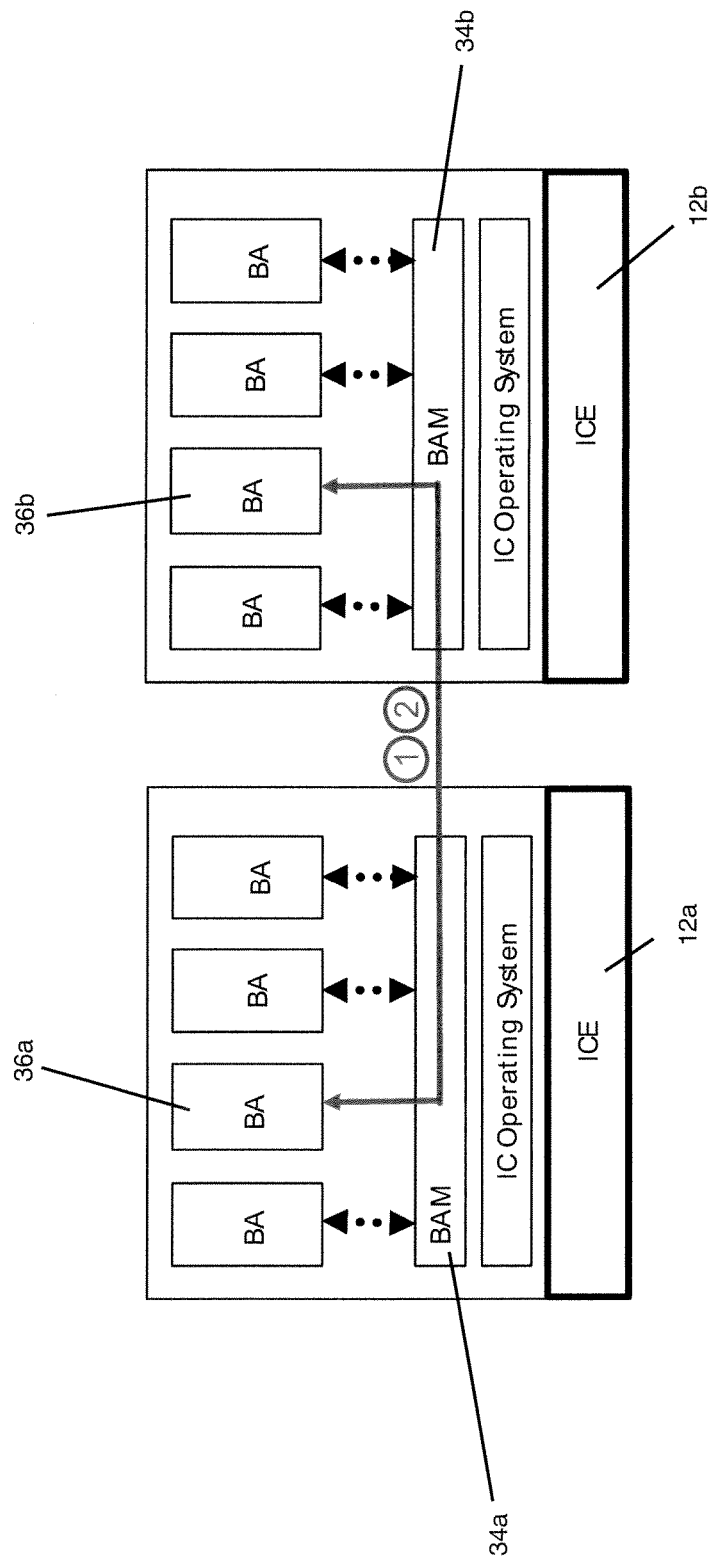
FIG. 7 is a schematic representation of inter BA communications in which information from a BA on one integrated circuit element (ICE) in a PD is relayed to another BA on another ICE in the device.

FIG. 7 shows an example of Inter BA Communications (IBAC) request/response communication between two BAs 36a,36b that are resident on different ICEs 12a,12b. The information passed between the BAs 36a,36b could be used by the recipient BA to derive new information that could be presented to the customer either automatically or upon request. An example of this use of this kind of interaction could be a transit BA 36 on a transit dedicated ICE 12 providing usage data to a loyalty application on an EMV chip, which calculates loyalty points based on the usage and adds them to a loyalty account balance. (Similar interaction may occur between BAs 36 on the same ICE 12).

Inter-ICE/UDIM Communications Security

The link between an ICE 12 and a UIDM 18 or another ICE 12 on the same PD 10 may be secured by establishing a secure channel, such as via an encryption protocol.

Network Message Flows

This sub-section gives descriptions and illustrations of the network message flows relating to PD based Customer Information Services. The scenarios shown are not intended to be exhaustive. They illustrate the normal flows between the different actors in relation to the kind of situations that are most likely to be encountered in practice. It should be noted that a single business entity may carry out more than one actor's role. Examples of this situation are shown below but many other permutations are possible in practice.

Figure 8:
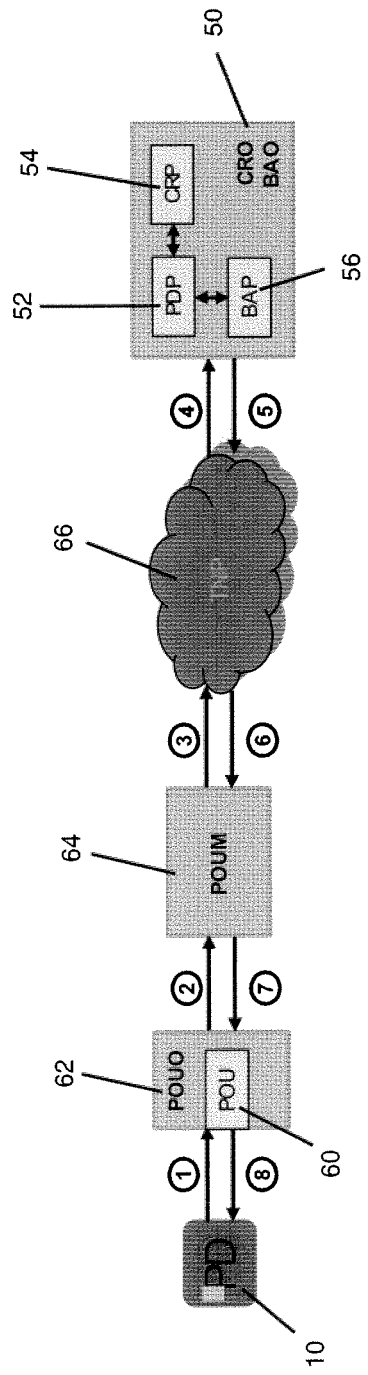
FIG. 8 is a schematic representation of a network message flow in which a single business entity that is the CRO (Customer Relationship Owner) owns all of the BAs on the PD and carries out all of its own processing.

FIG. 8 illustrates a situation where the business entity that is the Customer Relationship Owner (CRO) 50 owns all of the BAs 36 on the PD 10 and carries out all of its own processing. The CRO might typically be the issuer of a debit or credit card, or the operator of a transport system, for example. (Situations where some or all of the processing activities are outsourced are common.) When the PD 10 is used to request information at a Point of Use (POU) 60, the message is sent via the POU Manager (POUM) 64, such as the acquiring bank in a financial transaction, and the Trusted Network Processor (TNP) 66, such a MasterCard, to the Personal Device Processor (PDP) 52 (flows 1 through 4). The PDP 52 has links to a Customer Relationship Processor (CRP) 54 and a Business Application Processor (BAP) 56 to request/receive any necessary authorizations and information. A response message containing the requested data is sent back by the PDP 52 to the PD 10 (flows 5 through 8).

Figure 9:
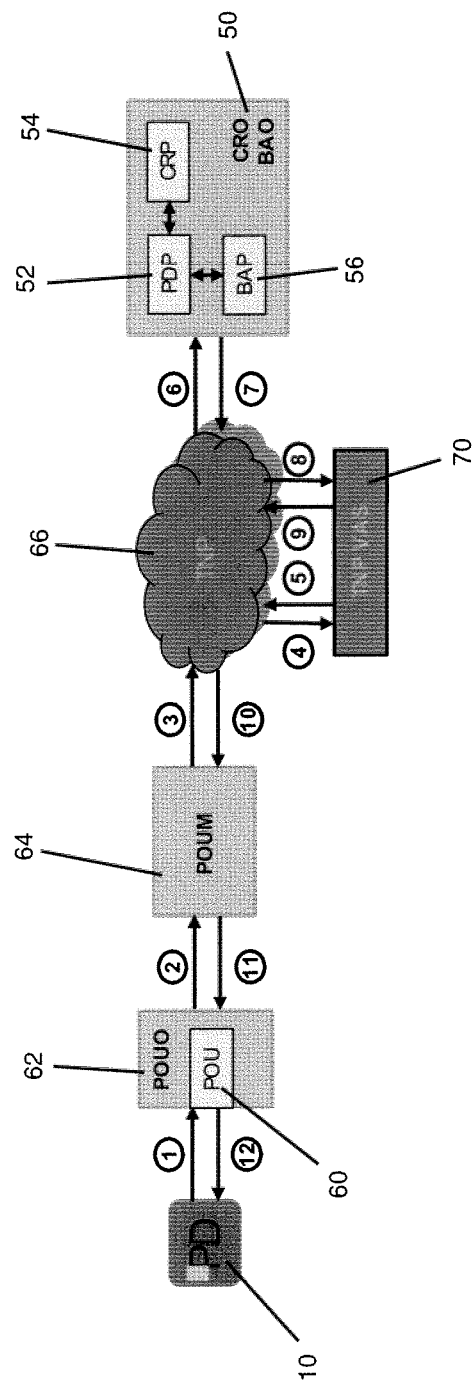
FIG. 9 corresponds to FIG. 8, but shows a network message flow in which the trusted network processor (TNP) carries out additional value-added services (VAS)

The next schematic (FIG. 9) is similar to the previous example, save that the TNP 66 carries out additional value-added services (VAS) related to the incoming request and outgoing response rather than the message simply being passed through to the CRO 50. The VAS might consist, for example, of providing additional data to the PDP 52 to use in generating the information to be returned to the PD 10. The incoming request (flows 1, 2 and 3) is intercepted by the TNP 66 and passed to the VAS processor 70 (flow 4) and then returned to the TNP 66 (flow 5) to be sent on to the PDP 52 (flow 6). The response message returned by the PDP 52 (flow 7) may be routed through the VAS processor 70 for further processing (flows 8 and 9) before being returned to the PD 10 (flows 10, 11 and 12).

Figure 10:
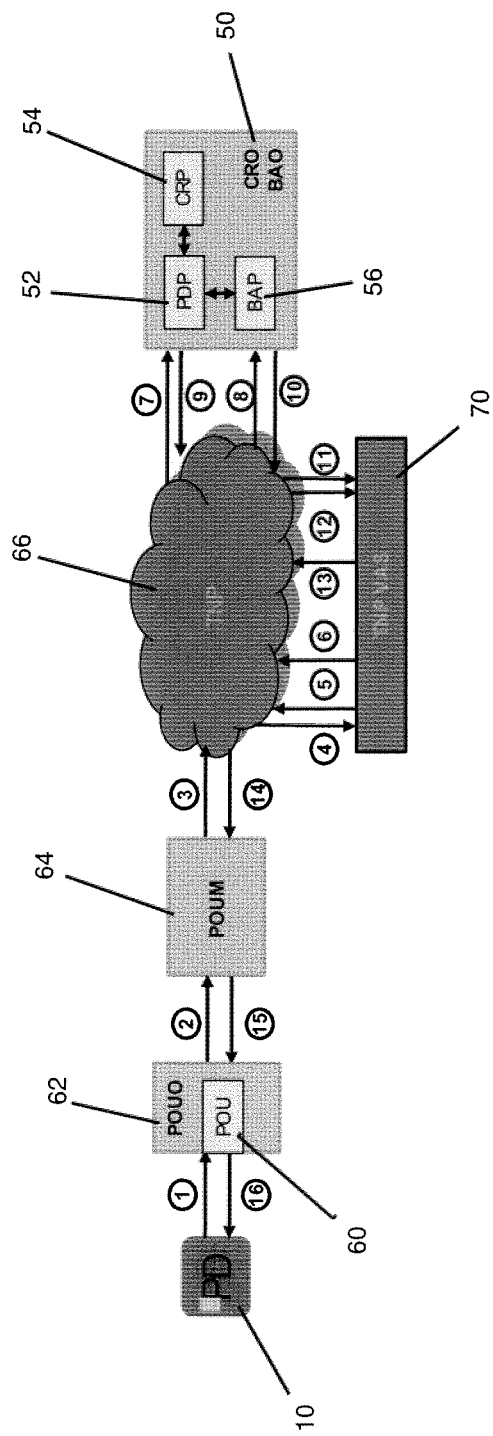
FIG. 10 is similar to FIG. 9, but shows a situation where the VAS is required to create a second message.

Again, the following diagram (FIG. 10) is somewhat similar to the previous one but in this case the VAS processor 70 is required to create a second message (flow 6) and forward it to the PDP 52 as well as the original request message (flow 5). The PDP 52 therefore receives two messages (flows 7 and 8) and returns two response messages (flows 9 and 10). These responses are routed to the VAS processor 70 for further processing (flows 11 and 12) to combine them into a single response (flow 13) to be returned to the PD 10 (flows 14, 15 and 16). This situation might arise when the incoming information request is either implied by or is sent as an attribute of another type of message (say, a request for funds authorization for a purchase).

Figure 11:
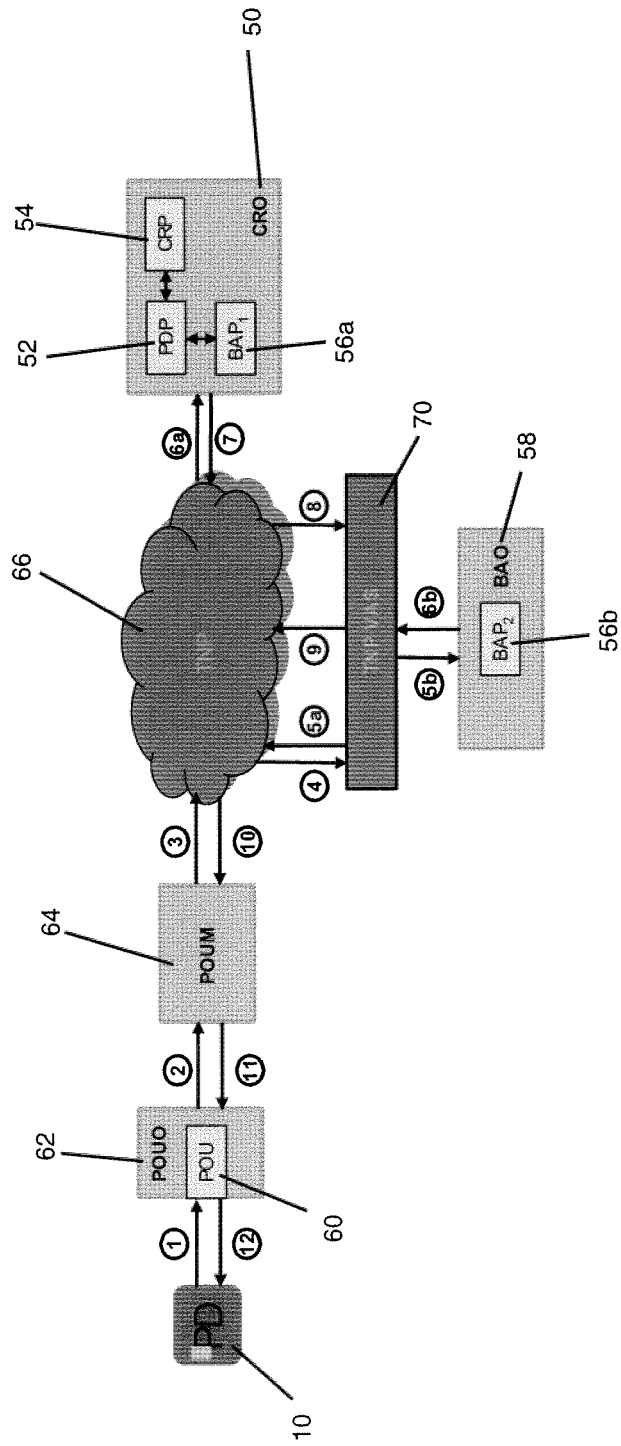
FIG. 11 is again similar to FIG. 9, but illustrates a scenario in which the CRO has a partner that owns one of the BAs on the PD.

The next schematic (FIG. 11) illustrates a scenario in which the CRO 50 has a partner that owns one of the BAs 36 on the PD 10 and is therefore a Business Application Owner (BAO). Consequently, the VAS processor 70 is required to split an incoming message and route one part of the split message to the PDP 52 for processing in the CRO's system, optionally with additional input from a first BAP 56a, and to route the other part of the split message to a separate BAP 56b in the BAO's system 58, then marry up the responses and send a single response back to the PD 10. As the diagram shows, the incoming transaction (flows 1, 2 and 3) is intercepted by the TNP 66 and sent to the VAS processor 70 (flow 4) which splits it into two messages, one to the partner Business Application Owner's (BAO's) BAP 56b (flow 5b) and one back to the TNP 66 (flow 5a) to be set to the PDP 52 (flow 6a). The partner BAO's BAP 56b sends a response messages (flow 6b) to the VAS processor 70 and the PDP 52 sends a response message to the TNP 66 (flow 7) which routes it to the VAS processor 70 (flow 8). Then, the VAS processor 70 combines these two responses into a single response (flow 9) that is sent back to the PD 10 by the TNP 66 (flows 10, 11 and 12).

Information Service Proposition Concepts

This section describes concepts relating to Customer Information Service propositions.

Service Categories

The information services to be provided have been categorized as:
 remote authentication using a One-time Password (OTP);
 value added and customer/account services e.g. balance display; and
 marketing e.g. promotional messages.

Data Generation/Delivery

The data required to drive the information services could be either:

generated by an application on a chip 12 on the card 10 using data stored on the chip. Examples include OTP generation and innovative functions like displaying birthday greetings or alerts when loyalty points reach a given threshold; or delivered to the card 10 from the issuer's system 50. Examples are the downloading of the current account balance or a revised credit limit; or delivered to the card from a merchant's system 62. An example would be a promotional message.

Data Display

The display of the information could be either:

automatic (e.g. a promotional message displayed when the card 10 is withdrawn from a point-of-sale (POS) terminal 60); or initiated by the cardholder using the control button(s) 16.

There follows in some detail an example of an Account Balance Display service for a payment card, a typical physical architecture of which is described below by reference to FIG. 12.

The display of data may be secured by requiring PIN entry or may be unsecured.

Service Consistency

The cardholder's experience of a given display card information service should be as consistent as possible across different methods of delivery or generation of the relevant data. For example, account balance data might be delivered online via an ATM or a branch or POS terminal or generated by the chip 12 based on stored previous balance and offline transaction data. The cardholder's interaction with the display card 10 to request a balance display should not be affected; however, the display 14 may indicate whether it is an actual (online) balance or estimated (generated) one.

Account Balance Display Service Proposition

The Account Balance Display service may work with debit, credit, charge and prepaid cards, and the same or similar other types of card products. The service may also be extended to other types of information such as loyalty point balances.

A number of potential service levels have been identified in relation to the Account Balance Display service. Each of these levels is described in the following subsections.

Online Delivery

After a display card 10 is used at an online branch or POS terminal or ATM and the button 14 is pressed, the customer's account balance is displayed. The balance displayed is the same as that which would have been displayed if a balance inquiry had been made at that time with a normal card at an ATM and the balance displayed on the ATM screen.

Automatic Offline Update

At this service level, the above online service is enhanced by automatic adjustment of the last recorded balance for transactions made in the account currency at offline terminals.

Manual Offline Transaction Adjustments

At this service level, a manual adjustment facility is added to the functionality of the previous service level. This facility will allow cardholders to adjust the last recorded balance for offline transactions made in a currency other than the account currency.

Extended Manual Offline Transaction Adjustments

The functionality of the preceding service level is enhanced at this service level by extending the manual adjustment facility to enter Card Not Present (CNP) and non-card transaction amounts to adjust the last recorded balance.

Automatic Recurring Transaction Adjustments

At this final service level, the functionality of the preceding service levels is enhanced with automatic adjustment of the last recorded balance for recurring transactions. Recurring transactions may include, for example, direct debit, standing order, monthly paycheck, etc.

This functionality requires details of recurring transactions (amount, sign [debit or credit], periodicity, next due date and rules for determining payment dates that would otherwise fall on non-business days) to be stored on the chip 12 and updated when necessary. These details could be entered manually or downloaded by the issuer using scripts.

Architectures and Information Flows

This section describes the technology and architectures relevant to implementing a Payment/Display Card service and related assumptions and constraints.

Assumptions and Constraints

It is intended to make use of existing payment technologies, systems and networks in delivering Display Card Information Services. In order to minimize costs, risks and time to market, the following constraints on any Display Card Information Services solution are assumed:

there must not be any change to POS and/or ATM software or related transaction flows;

existing message formats must be used (however, changes to the data transported within current formats are permissible if such changes are essential and unavoidable); and there must not be any change to Acquirer transaction processing.

Any Display Card Information Services solution should aim to minimize the impact on the issuer's networks and systems.

Information Delivery

The delivery of data required for information services purposes to the card could be accomplished by either:

wide-area wireless communication via either a wi-fi component or mobile network SIM (Subscriber Identification Module) integrated into the card 10;

NFC (Near Field Communication) wireless communication using EMV contactless technology; or wired communication via the contact EMV chip 12.

Wide-area wireless communication would be ideal from a service viewpoint, since it would give a direct link between issuer 50 and card 10. However, suitable products are not yet available and would probably be prohibitively expensive at this juncture. Accordingly, detailed consideration of this approach is deferred for the time being.

EMV contactless technology may also be used with the invention, but is not considered separately in this paper since the system architecture and information flows are similar to those for EMV contact technology.

Card Architecture

The following sub-sections give high level descriptions of the physical and software architectures of a combined Payment/Display Card 10.

Physical Card Architecture

Figure 12:
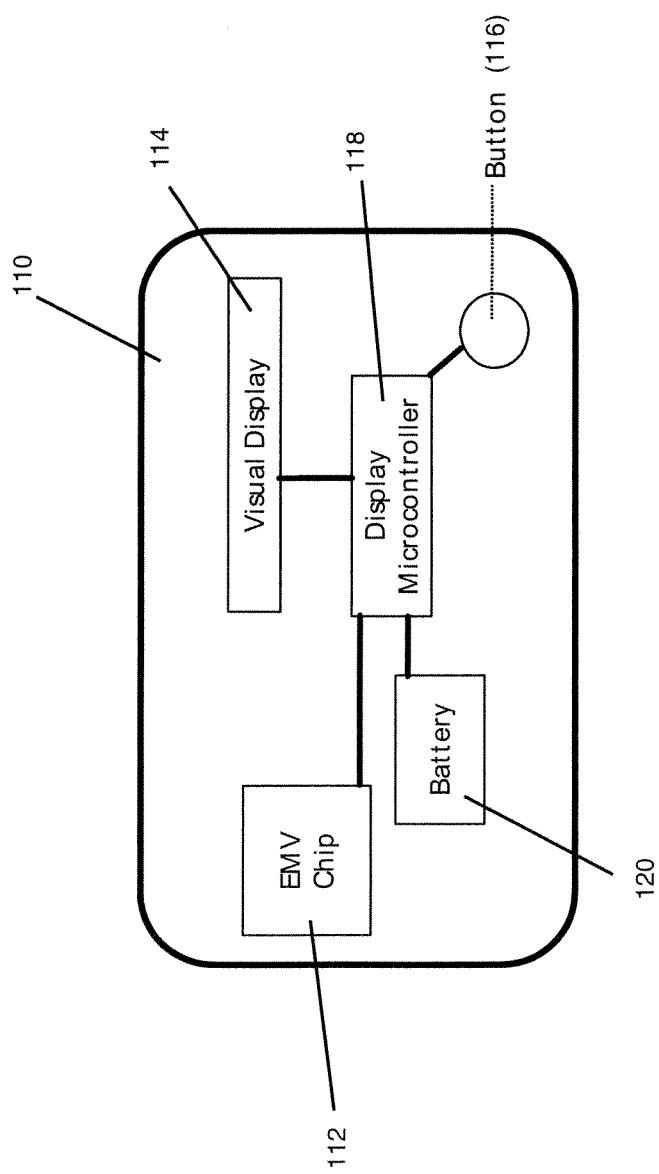
FIG. 12 illustrates one embodiment of a physical architecture of an EMV-enabled information display card.

The basic physical card architecture of a combined EMV Payment and Display Card 110 is illustrated in FIG. 12. Cards with this general configuration are available from several manufacturers, including major players.

The visual display 114 is driven by the display microcontroller 118, both being powered by the battery 120. The EMV chip 112 may be a contact, contactless or dual interface version (the antenna required for contactless operations is not illustrated). A physical connection is required between the EMV chip 112 and the display microcontroller 118 to facilitate the transfer of data between these elements. Whilst only a single button 116 is illustrated, in practice there may be multiple buttons, such as numbers 0-9, a 'select' (or 'OK') button and a 'back', 'delete' or 'cancel' button. The button(s) 116 allow the cardholder to initiate the display of required information. The visual display 114 and button(s) 116 may be positioned on the face or back of the card 110.

Card Software Architecture

Figure 13:
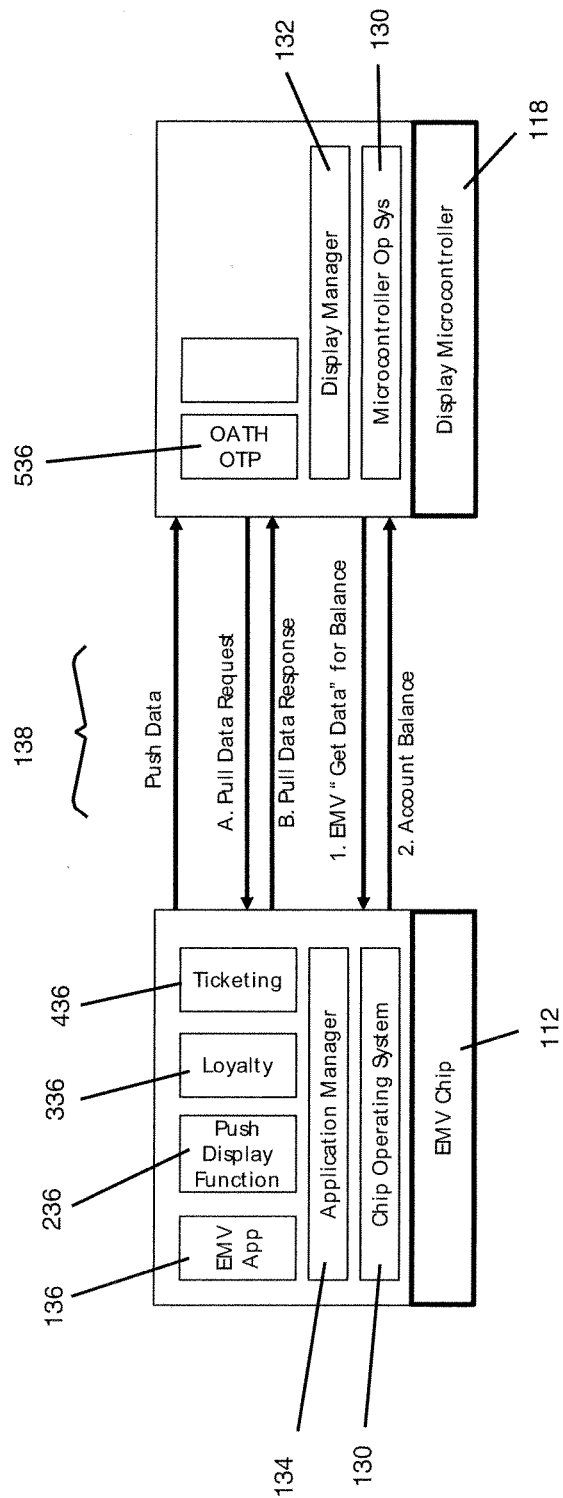
FIG. 13 is a schematic representation of one embodiment of a general software architecture for the card of FIG. 12.

A general software architecture for the above type of card 110 is illustrated in FIG. 13. The EMV chip 112 has an operating system capable of supporting multiple applications, such as MULTOS or Java Card. The display microcontroller 118 could have a single or multi-application operating system.

Both chips 112,118 may have resident applications 136-536. Obviously, the EMV application 136 must reside on the EMV chip 112. Potentially, some applications could run on either chip e.g. OTP using either OATH 536 or CAP/AA4C. (The use of CAP/AA4C on a non-EMV chip would require prior approval of the chip type; use of OATH on the EMV chip 112 is permissible).

As illustrated above in relation to the physical architecture, there is a communications link 138 between the EMV chip 112 and display microcontroller 118. Data to be displayed may be (a) pushed by the EMV chip 112 to the display microcontroller 118; or (b) pulled by the latter making a request to the EMV chip 112. All interactions between the EMV chip 112 and display microcontroller 118 across this physical link 138 must be secured by encryption. The application management systems 134,132 on the EMV chip 112 and display microcontroller 118 must be able to route and control these interactions.

Standard EMV communications protocol and commands should be used as far as possible. For example, for an account balance request and response, messaging could be based on the card/terminal protocol and Balance Inquiry message (as illustrated above). A similar approach could be used for a transaction list request and response.

For other uses, it may be necessary to define a new protocol. Such a protocol must allow for data to be both pushed to the display microcontroller 118 by the EMV chip 112 and pulled from the EMV chip 112 by the display microcontroller 118. Examples of applications 236 that might be domiciled on the EMV chip 112 and use the push approach are: applets managing marketing messages; birthday greetings, triggered either by request from terminal or automatically by applet (e.g. when card limit or points total reached; on specified date etc.). Third party applications held on the EMV chip 112, like Merchant Loyalty (points balance) 336 and Transit Ticketing (balance) 436, could use the pull approach after use in the relevant terminal/network, e.g. specific merchant's terminals for dedicated loyalty scheme; bus/rail operator's terminal, to retrieve and display relevant information. This is analogous to the approach for Account Balance display.

Network Architecture and Transaction Flows

Given the stated assumptions and constraints, acquirers' normal ATM and POS networks and the standard payment network architecture linking acquirers and issuers may be used without change. Similarly, standard network messages may be used.

A branded display card 110 could be used at a branch or POS terminal or an ATM that is linked to a network owned by the relevant issuer or one owned by a separate acquirer. The former case is not considered here.

There are two main transaction flow scenarios: firstly, a standard end-to-end message flow between acquirer and issuer; and, secondly, an "On Behalf Of" flow, in which the TNP 66 provides display card related services for the issuer 50. These scenarios are considered further below.

Standard Transaction Flow—Display Data Only

Figure 14:
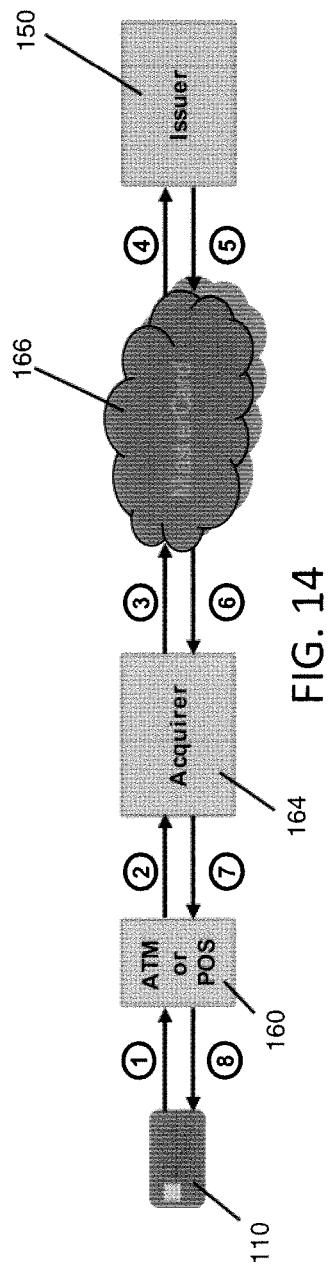
FIG. 14 illustrates a standard end-to-end transaction flow for an EMV-enabled display card (for sending display data only to the card)

FIG. 14 illustrates the standard, known, end-to-end transaction flow for a display card 110. The card 110 is inserted into a terminal 160, such as an automated telling machine (ATM) or a point of sale (POS) terminal and a standard online transaction is initiated, e.g. a purchase authorization, which is received by the acquirer 164 and routed to the issuer 150 via the TNP 166 as normal (flows 1 to 4 inclusive). The issuer 150 may recognize that the transaction calls for data to be sent to the card 110 for display either from the transaction type (e.g. all authorizations) or from another attribute or attributes (e.g. zero amount authorization). The issuer 150 responds to the request with the appropriate response message (e.g. approval in response to authorization request) and incorporates in it a script containing the required data for display (flows 5 to 8 inclusive).

On Behalf of Transaction Flow

Figure 15:
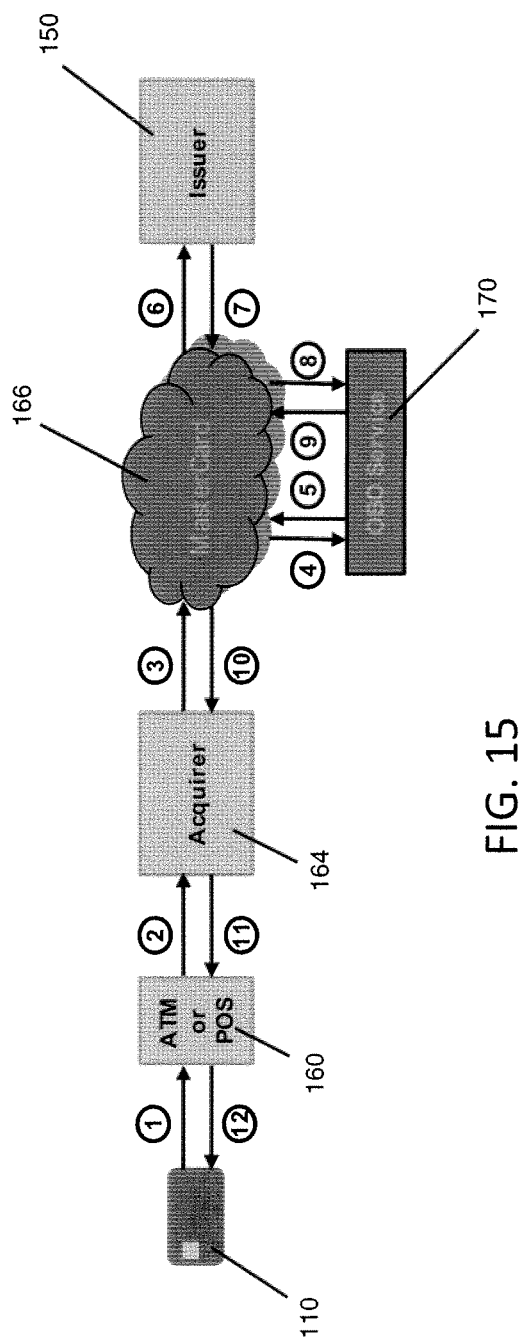
FIG. 15 corresponds to FIG. 14, but shows an 'On Behalf Of' transaction flow, in which the TNP provides display card services.

FIG. 15 shows a generalized transaction flow for the situation where the TNP 166 provides display card related services. These services would typically revolve around recognizing incoming transactions that call for data for display to be provided, obtaining the required data from the issuer 150 and generating a script containing the required data to be sent back to the card 110 in the response.

As with the standard transaction flow discussed above, the card 110 is inserted into a terminal 160 and a standard online transaction is initiated, e.g. a purchase authorization, which is received by the acquirer 164 and sent to the TNP 166 as normal (flows 1, 2 and 3). The TNP system 166 recognizes that the transaction calls for data to be sent to the card, in the same way as described in the previous sub-section. On recognizing that data is required, the request message is routed to a VAS processor 170 in communication with the TNP processor 166, which VAS processor 170 generates a standard message requesting that data (e.g. balance inquiry); and routes it to the issuer 150 via the TNP 166 (flows 4, 5 and 6). The issuer 150 responds with the required data, again using a standard message, e.g. balance inquiry response (flow 7). The issuer's response is matched to the original request by the TNP 166 and the VAS processor 170 and the appropriate response message and script containing the required data is generated (flows 8 and 9) and sent back to the card 110 (flows 10, 11 and 12).

This scenario is appropriate for transactions that only require the issuer 150 to provide the data for display and do not require any other action or decision by the issuer (e.g. a zero amount transaction, which requires no authorization, would qualify). A more complex scenario is described below.

On Behalf of Transaction Flow—Split Messaging

Figure 16:
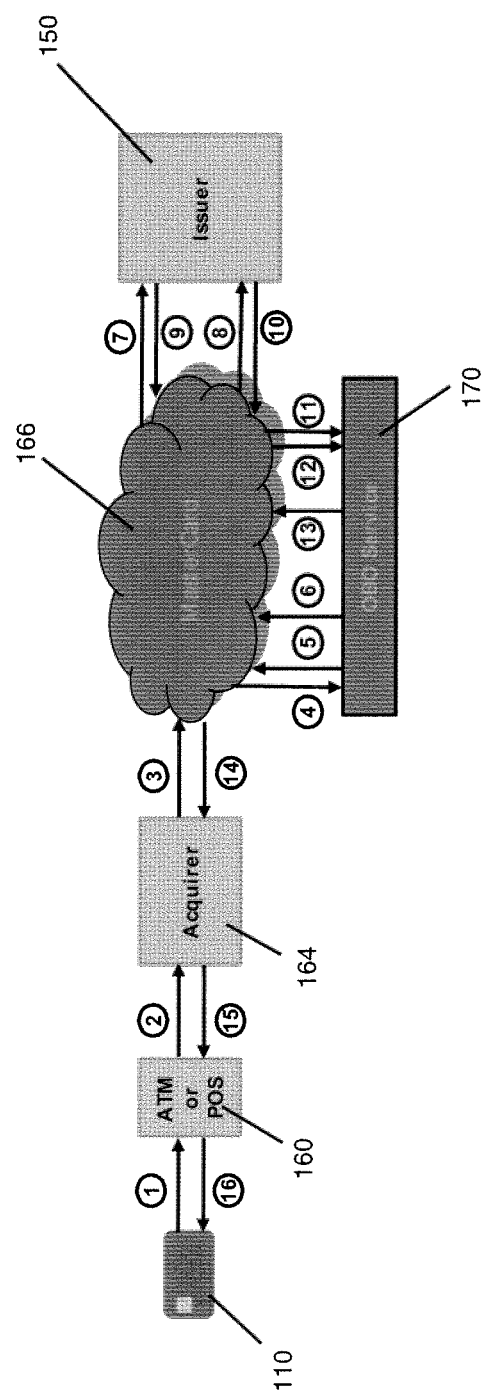
FIG. 16 substantially corresponds to FIG. 15, but illustrates a situation where the TNP creates a second message to be sent to the issuer.

FIG. 16 illustrates a situation where the TNP 166 creates a second message to be sent to the issuer 150. This situation could arise, for example, when an authorization request for a non-zero amount is received that also requires the return of data for display, so that the issuer 150 needs to both make a decision on the authorization request and generate and return the required data for display.

As before, the card 110 is inserted into a terminal 160 and a standard online transaction is initiated, e.g. a purchase authorization, which is received by the acquirer 164 and sent to the TNP 166 as normal (flows 1, 2 and 3). The TNP system 166 and the VAS processor 170 recognize (flow 4) that the transaction calls for an authorization decision and also for data to be sent to the card (in the same way as described above). On recognizing that both authorization and data are required, the request message is routed to the VAS processor 170, which in turn routes the authorization request to the issuer 150 via the TNP 166 in a first standard message (flows 5 and 7), and also generates a second standard message requesting the data required for display (e.g. balance inquiry) and routes it to the issuer 150 via the TNP 166 (flows 6 and 8).

The issuer 150 responds with a standard authorization response message (flow 9) and the required data, again using a standard message, e.g. balance inquiry response (flow 10). The issuer's responses are matched to the original request by the TNP 166 and the VAS processor 170 (flows 11 and 12) and the appropriate response message and script containing the required data is generated (flow 13) and sent back to the card (flows 14, 15 and 16).

On Behalf of Transaction Flow—Third Party Split Messaging

Figure 17:
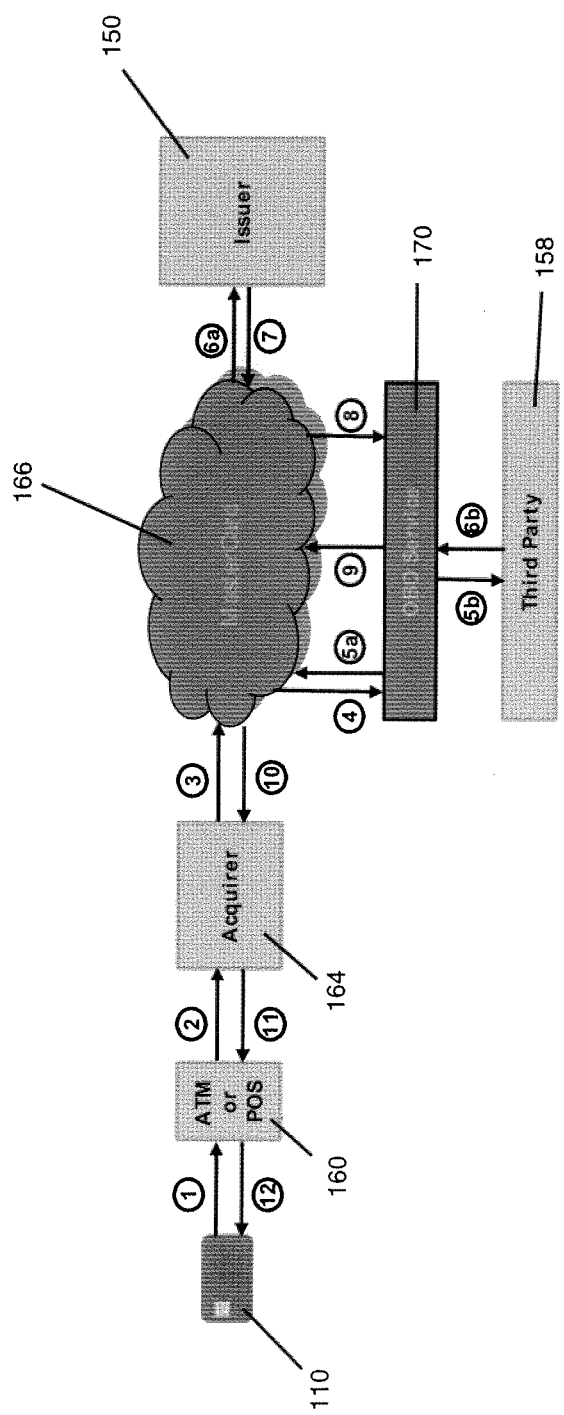
FIG. 17 substantially corresponds to FIG. 16, but illustrates a situation where the second message created by the TNP is sent to a third party, whilst the first message is sent to the issuer.

The situation illustrated in FIG. 17 is similar to that in the previous subsection, except that when the second message is generated it is routed to a third party system 158 that holds the data required for display rather than the issuer's system 150. In this case, the outgoing messages to the issuer 150 and third-party 158 can be sent concurrently (flows 5*a* and 5*b*) rather than sequentially.

Processing Steps

The processing steps undertaken by the TNP 166 in relation to the On Behalf Of scenarios described in the above sub-sections represent a 3-step process that can be summarized as: <<Trap-Expand-Consolidate>>:

<<Trap>>

A Selection & Routing mechanism is required to identify which transactions will be routed to the <<On Behalf Of>> service 170 and not directly to the Issuer 150. Selection could be based on one or more of a number of properties (e.g. bank identification number (BIN) range; Account Number Range; Message Type etc.).

<<Expand>>

Based on the original authorization request and possibly other data, the <<On Behalf Of>> service 170 would generate one or more additional requests to the Issuer 150 or third parties 158.

<<Consolidate>>

After receiving the responses to all the requests (i.e., the original authorization request and the additional ones generated on-the-fly), the <<On Behalf Of>> service 170 would consolidate all the information into one response message sent back to the TNP network 166. This message must contain all the information (in an Issuer Script) required for storing and display by the card 110.

Issuer Systems

Issuers that do not avail themselves of the "On Behalf Of" services will require advice and guidance to enable them to implement Display Card Information Services. The following sub-sections indicate the kind of changes and enhancements that may need to be made to issuer systems to deliver an Account Balance Display Service, according to the service level (as described in the section headed 'Account Balance Display Service Proposition') offered.

Online Delivery

Typically, the balance downloaded to the card will be the "available to spend" (i.e. account ledger balance less outstanding authorizations and after taking into account the concurrent transaction). The Online Delivery service level proposition should have the least impact on the issuer's system.

The issuer's authorization system will require the ability to:
    trigger a balance inquiry, as well as authorization processing, on receipt of an authorization request;
    match the authorization decision and balance data returned; and
    generate an authorization response incorporating a script containing the balance.

Automatic Offline Update

To facilitate automatic offline updates in addition to online delivery, an issuer's system will require functionality similar to pre-authorized debit processing to adjust the account ledger balance for outstanding offline card transactions (based on the card's Cumulative offline Transaction Amount [COTA] and Application Transaction Counter [ATC] value) before downloading balance to card during online contact. Examples of possible issuer system architectures are available separately.

Extended Manual Offline Transaction Adjustments

The "pre-authorized like" functionality referred to in the previous sub-section will need to be extended to take into account uncleared CNP and non-card transaction amounts in the adjustment of the account ledger balance.

Automatic Recurring Transaction Adjustments

If this service enhancement is facilitated by manual entry of the required recurring transaction details then no further changes to the issuer's systems will be required. If the issuer wishes to deliver the required details to the card using scripts, then there will be changes to extract the relevant data from the database(s) of record and construct appropriate scripts. If it is desired to store details of recurring transactions on the card prior to it being issued to the cardholder then card personalization processes will also be impacted.

In the foregoing, the elements handling the transaction flows at the TNP and the issuer, as well as in third party systems, have been described as processors. It will be understood that such processors could comprise one or more servers or other suitable computing means.

The invention claimed is:

1. A transaction processing system for sending user information data to a personal device, the system comprising:
    an integrated circuit card comprising:
    an integrated circuit element; and
    a display device for making information known to a user of the integrated circuit card;
    an interface device for transmitting data to and from the integrated circuit card;
    a communications network connecting to the interface device;
    an issuer processor connected to the communications network; and
    a trusted network processor (TNP) processor connected to the communications network, interposed between the interface device and the issuer processor, and arranged to receive, via an acquirer bank, a transaction request message from a user of the integrated circuit card and to transmit a response message back to the integrated circuit card;
    wherein the TNP processor is arranged to identify, dependent on properties of the transaction request message, whether the associated response message will require data related to an account balance or credit limit to be sent to the display device, the TNP processor further identifying that the transaction additionally calls for an authorization decision, and if so identified, to:

split the transaction request message into a first standard message requesting authorization and a second standard message requesting the required user information;
route the authorization request message to the issuer processor;
route the required user information request message to the issuer processor;
receive an authorization response message from the issuer using another standard message;
receive the required data from the issuer processor using another standard message;
match the received required data and authorization response to the original request;
generate an appropriate response message and script containing the required data and authorization; and
transmit the response message back to the integrated circuit card thereby making the required information known to the user and authorizing the transaction.

2. The system of claim 1, wherein the integrated circuit element comprises an EMV chip.

3. The system of claim 1, wherein the interface device comprises a point of sale terminal.

4. The system of claim 1, wherein the integrated circuit card and the interface device each have near-field communication capabilities for the contactless transmission of data therebetween.

5. The system of claim 1, wherein the integrated circuit card and the interface device each have electrical contacts and data transmission between the integrated circuit card and the interface device is by wired communication between the respective contacts.

6. The system of claim 1, wherein the interface device comprises a wide-area wireless communication integrated into the integrated circuit card.

7. The system of claim 1, wherein the integrated circuit element hosts business application software.

8. A method of sending user information data to an integrated circuit card, the method being in a transaction processing system and comprising the steps of:
receiving, at a trusted network processor (TNP) server, from an acquirer bank, a transaction request message from a user of the integrated circuit card;
identifying, dependent on properties of the transaction request message, whether an associated response message will require data related to an account balance or credit limit to be sent to a display device that is part of the integrated circuit card, and further identifying that the transaction additionally calls for an authorization decision, and if so identified:
splitting the transaction request message into a first standard message requesting authorization and a second standard message requesting the required user information;
routing the authorization request message to the issuer processor;
routing the required user information request message to the issuer processor;
receiving an authorization response message from the issuer using another standard message;
receiving the required data from the issuer processor using another standard message;
matching the received required data and authorization response to the original request;
generating an appropriate response message and script containing the required data and authorization; and
transmitting the response message back to the integrated circuit card thereby making the required information known to the user and authorizing the transaction.

9. The method of claim 8, further comprising making the required data known to the user of the integrated circuit card through the display device.

10. The system of claim 1, wherein:
the properties of the transaction request message include the transaction request message calling for data to be sent to the integrated circuit card; and
the TNP processor is further arranged to recognize that the transaction request message calls for data to be sent to the integrated circuit card.

11. The method of claim 8, wherein the properties of the transaction request message include the transaction request message calling for data to be sent to the integrated circuit card;
and the method further comprising:
recognizing, at the TNP server, that the received transaction request message calls for data to be sent to the integrated circuit card.

* * * * *